US012303460B2

(12) United States Patent
Rasheed et al.

(10) Patent No.: US 12,303,460 B2
(45) Date of Patent: May 20, 2025

(54) MOISTURE PROTECTION FEATURES FOR A BOTTLE FOR STORING SOLID PHARMACEUTICAL PRODUCTS AND METHODS OF MAKING SAME

(71) Applicant: MERCK SHARP & DOHME LLC, Rahway, NJ (US)

(72) Inventors: Wail A. Rasheed, Union, NJ (US); Cassie R. Megna, Jersey City, NJ (US); Ophelia L. Wells, Pottstown, PA (US); John B. Cline, Monroe, NJ (US)

(73) Assignee: Merck Sharp & Dohme LLC, Rahway, NJ (US)

( * ) Notice: Subject to any disclaimer, the term of this patent is extended or adjusted under 35 U.S.C. 154(b) by 117 days.

(21) Appl. No.: 17/910,922

(22) PCT Filed: Mar. 25, 2021

(86) PCT No.: PCT/US2021/024026
§ 371 (c)(1),
(2) Date: Sep. 12, 2022

(87) PCT Pub. No.: WO2021/202214
PCT Pub. Date: Oct. 7, 2021

(65) Prior Publication Data

US 2023/0172805 A1 Jun. 8, 2023

Related U.S. Application Data

(60) Provisional application No. 63/001,751, filed on Mar. 30, 2020.

(51) Int. Cl.
*A61J 1/03* (2023.01)
*B65D 25/54* (2006.01)
(Continued)

(52) U.S. Cl.
CPC ................ *A61J 1/03* (2013.01); *B65D 25/54* (2013.01); *B65D 51/30* (2013.01); *B65D 81/268* (2013.01)

(58) Field of Classification Search
CPC .... B65D 81/266; B65D 81/268; B65D 51/30; B65D 25/54; A61J 1/03
(Continued)

(56) References Cited

U.S. PATENT DOCUMENTS 4,350,508 A 9/1982 Santoro et al.
4,717,018 A * 1/1988 Sacherer ............ A61B 10/0096 220/826
(Continued)

FOREIGN PATENT DOCUMENTS

CN 201367186 Y 12/2009
CN 106043878 A 10/2016
(Continued)

OTHER PUBLICATIONS

International Search Report and Written Opinion for PCT/US2021/024026, mailed Jul. 12, 2021; 17 pages.

*Primary Examiner* — Steven A. Reynolds
(74) *Attorney, Agent, or Firm* — Dianne Pecoraro; John C. Todaro

(57) ABSTRACT

A bottle for storing solid pharmaceutical products includes a substantially cylindrical body having a sidewall, a top and a base defining an interior chamber, a first opening disposed on the top of the body, the first opening providing communication to the interior chamber and being eccentric with respect to the central longitudinal axis of the body, and a second opening disposed adjacent the first opening, the second opening being smaller than the first opening.

16 Claims, 5 Drawing Sheets

(51) Int. Cl.
*B65D 51/30* (2006.01)
*B65D 81/26* (2006.01)

(58) Field of Classification Search
USPC .......................................................... 206/204
See application file for complete search history.

(56) References Cited

U.S. PATENT DOCUMENTS 5,184,721 A * 2/1993 Wengyn .............. A61M 5/3205 422/301
5,678,684 A * 10/1997 Wright ..................... B44D 3/12 220/731
6,497,845 B1 * 12/2002 Sacherer .......... G01N 33/48778 422/561
8,887,944 B2 * 11/2014 Deane ................ B65D 81/3802 220/592.2
10,196,195 B2 * 2/2019 Guillon .................. B65D 81/32
2003/0178328 A1 * 9/2003 Williamson ............ B01L 3/508 220/23.88
2005/0118071 A1 * 6/2005 Sacherer ................. B01L 9/527 422/562
2011/0210021 A1 * 9/2011 Logel ............... G01N 33/48778 422/561
2013/0248557 A1 * 9/2013 Egger ....................... B65B 1/04 53/473
2014/0190845 A1 * 7/2014 Maness ..................... A61J 1/00 206/204
2015/0291338 A1 * 10/2015 Chen .................... B65D 51/244 206/204
2021/0309437 A1 * 10/2021 Kleinke ................. B65D 81/22

FOREIGN PATENT DOCUMENTS

CN 207917542 U 9/2018
WO 2020005884 A1 1/2020

* cited by examiner

MOISTURE PROTECTION FEATURES FOR A BOTTLE FOR STORING SOLID PHARMACEUTICAL PRODUCTS AND METHODS OF MAKING SAME

CROSS-REFERENCE TO RELATED APPLICATIONS

This application is a National Stage application of International Patent Application No. PCT/US2021/024026, filed Mar. 25, 2021, which claims priority to U.S. Provisional Patent Application No. 63/001,751, filed Mar. 30, 2020.

FIELD OF THE DISCLOSURE

The present disclosure relates generally to storing medicine. More specifically, the present disclosure relates to moisture protection features for a bottle for storing solid pharmaceutical products

BACKGROUND OF THE DISCLOSURE

Solid pharmaceutical products are commonly transported and stored in bottles. These solid pharmaceutical products themselves may be in the form of pills, capsules, caplets, tablets, and the like. Such pharmaceutical products may be susceptible to degradation and/or loss of efficacy when exposed to moisture. For example, the product may be exposed to the environment every time the user opens the bottle to retrieve a dose. To address this, desiccant cannisters and similar solutions are used to absorb moisture within the bottles.

However, the addition of desiccant cannisters, or loose sachets, to a bottle does not necessarily eliminate moisture issues. For example, desiccants are prone to falling out when the bottle is opened. If the desiccant is not returned to the bottle, this may result in an increased risk to product quality. If the desiccant falls out and is returned to the bottle, the pharmaceutical product may be unintentionally exposed to contaminants. There is also a risk of accidental ingestion of the desiccant for patients who are blind or who are not paying attention. Moreover, when the desiccant is lost, dissolution and/or breakdown of a drug product may cause an unknown and unintended therapeutic impact to patients. Additionally, accidental patient tampering of product (e.g., loss of desiccant or contamination of the pharmaceutical product) can go unnoticed and the patient may report compliance with their medication schedule even as their condition stays the same or worsens.

Thus, there exists a need for devices that improve upon and advance the methods of safely storing medicine in a container to ensure the quality and protection of the medicine, especially against moisture.

SUMMARY OF THE DISCLOSURE

In one embodiment, a bottle for storing solid pharmaceutical products includes a substantially cylindrical body having a sidewall, a top and a base defining an interior chamber, a first opening disposed on the top of the body, the first opening providing communication to the interior chamber and being eccentric with respect to the central longitudinal axis of the body, and a second opening disposed adjacent the first opening, the second opening being smaller than the first opening and being seated therein.

In one embodiment, a system of storing medication includes a bottle for storing solid pharmaceutical products comprising a substantially cylindrical body having a sidewall, a top and a base defining an interior chamber, and at least one opening defined in the top, and a substantially cylindrical cartridge configured and arranged to be received within the at least one opening, the cartridge being capable of securing at least one desiccant cannister.

In one embodiment, a method of controlling moisture in a bottle for storing solid pharmaceutical products includes providing a bottle comprising a substantially cylindrical body having a sidewall, a top and a base defining an interior chamber, and at least one opening defined in the top, providing a substantially cylindrical cartridge configured and arranged to be received within the at least one opening, the cartridge being capable of securing at least one desiccant cannister, loading the substantially cylindrical cartridge with at least one desiccant cannister, and advancing the substantially cylindrical cartridge through the at least one opening.

BRIEF DESCRIPTION OF THE DRAWINGS

Various embodiments of the instant invention are disclosed herein with reference to the drawings, wherein.

Various embodiments will now be described with reference to the appended drawings. It is to be appreciated that these drawings depict only some embodiments of the disclosure and are therefore not to be considered limiting of its scope.

DETAILED DESCRIPTION OF THE INVENTION

Despite the various improvements that have been made to containers and desiccants, conventional methods suffer from some shortcomings as discussed above.

As a result, there is a need for further improvements to the devices and methods used to help store solid pharmaceutical products while limiting the impact of moisture. Among other advantages, the present disclosure may address one or more of these needs.

Figure 1:
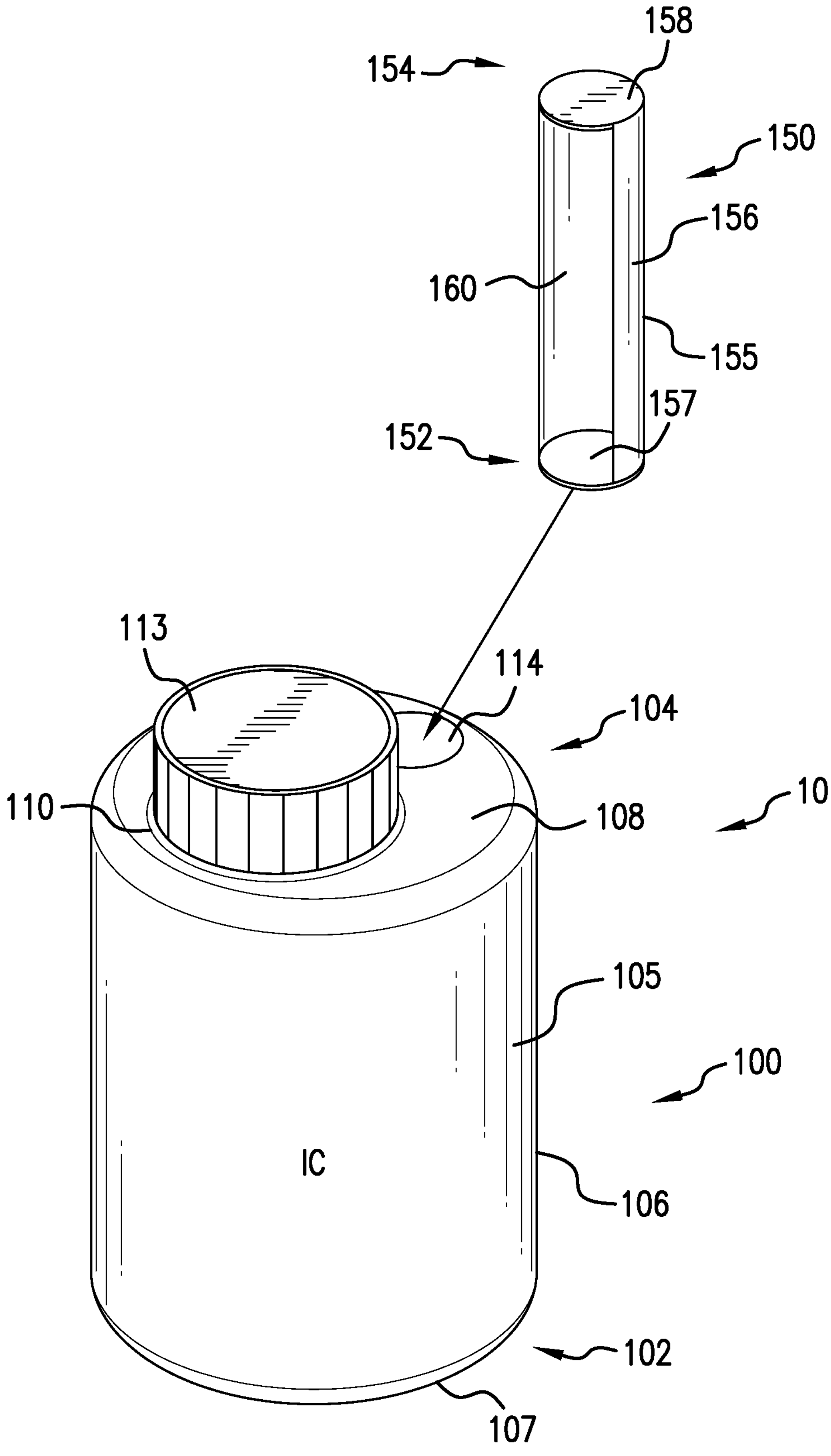
FIG. 1 is a schematic perspective view of a container and a cartridge according to one embodiment of the disclosure.
Figure 2:
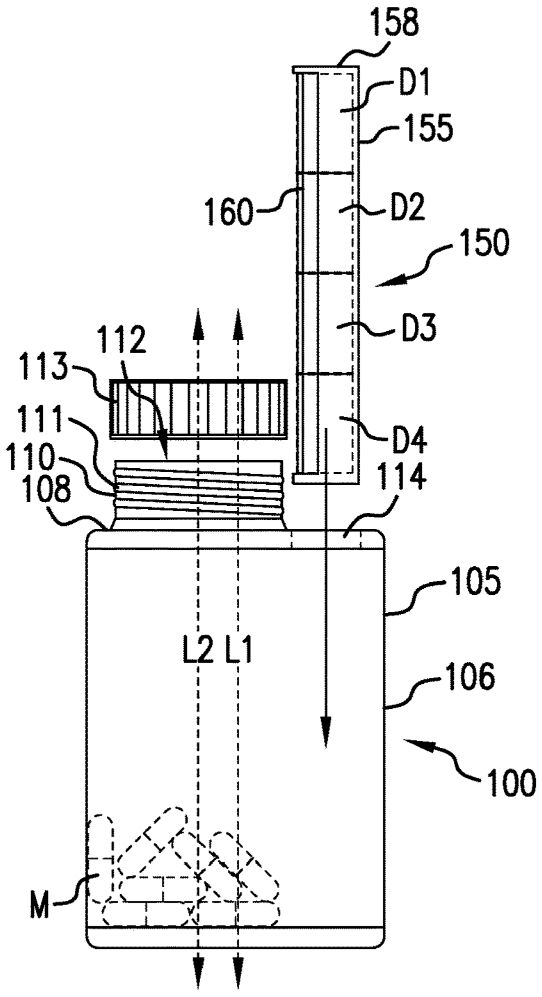
FIGS. 2-3 are schematic side views of the container and cartridge of FIG. 1 in unloaded and loaded states.

Reference is now made to FIGS. 1-5, which show schematic illustrations of a system 10 having a container 100 and a cartridge 150. In one example, container 100 may be in the form of a generally cylindrical bottle extending between a proximal end 102 and a distal end 104, and having body 105 including a circumferentially-extending sidewall 106, a base 107 and a top 108, the body defining an interior chamber "IC". Body 105 may be formed of a plastic or other suitable material as is known in the art. As best seen in FIG. 2, top 108 may define a neck 110 having a screw-type mechanism 111 and a first opening 112, the neck being capable of mating with an internally-threaded cap 113 to open and close the bottle and provide access to its contents. Cap 113 and/or neck 110 may have safety features to ensure that children are not able to open the bottle. In the example shown, first opening 112 may be eccentric with respect to the central longitudinal axis of the container 100. That is, first opening 112 may centered about an axis "L2" that is off-center or disposed away from the central axis "L1" of the container 100 and closer to one portion of the sidewall than to a diametrically opposed portion of the sidewall 106.

Figure 4:
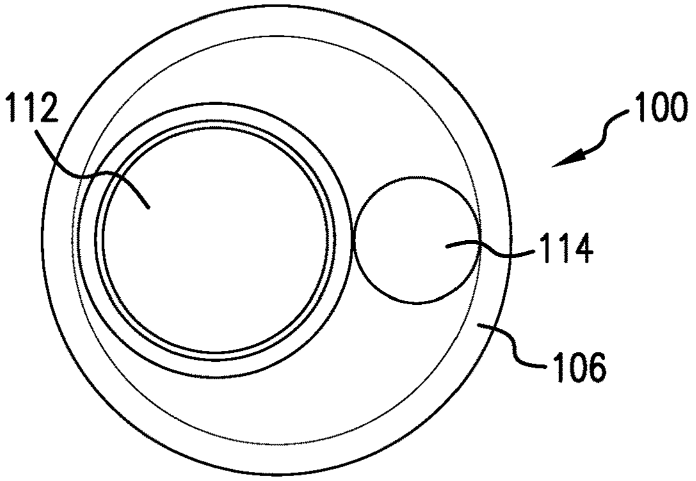
FIG. 4 is a schematic top view of the container of FIG. 1.

Container 100 may have a second opening 114 in top 108 that allows access to the interior chamber of the container, the second opening 114 being disposed adjacent first opening 112 (FIG. 4). Second opening 114 may be circular, oval, or have any other suitable shape. In at least some examples, second opening 114 has a smaller diameter than the first opening 112, or in the case of non-circular openings, second opening 114 may define a smaller area than first opening 112.

As seen in FIG. 1, a cartridge 150 receivable within second opening 114 may also be provided. Cartridge 150 may be substantially cylindrical as shown or may have another shape that is complementary to second opening 114. Cartridge 150 may have a body 155 extending between a proximal end 152 and a distal end 154. Body 155 may also include a circumferentially-extending sidewall 156. A window 160 may be formed in sidewall 156. In the example shown, window 160 is in the form of a cutout in the sidewall that extends from the top to the bottom of the cartridge. Alternatively, window 160 may be smaller or larger than shown. For example, window 160 may form anywhere between 25% and 75% of the surface area of the cartridge, excluding the top and bottom ends of the cartridge. In some examples, cartridge 150 may have an open lower inlet 157 for loading a desiccant into the cartridge, and a closed upper segment 158. Cartridge 150 may have a circumference that allows the container 100 to at least partially receive the cartridge and for the cartridge to be seated therein. Cartridge 150 and second opening 114 may be sized so that the cartridge is friction-fit or snap-fit within the second opening of the container, and so that closed upper segment 158 hermetically seals the container 100 when the cartridge is inserted into the second opening.

Figure 3:
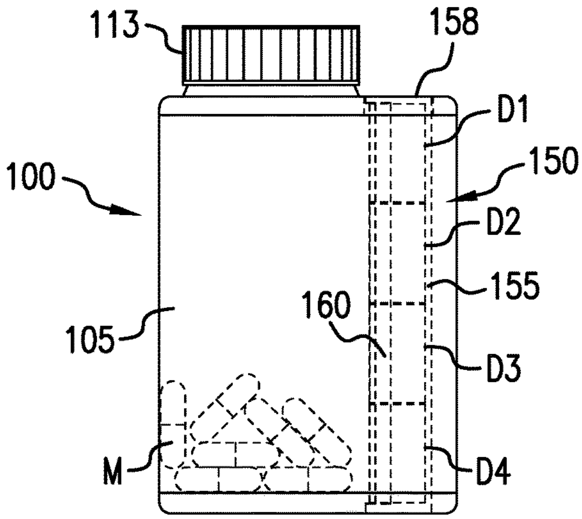
Figure 5:
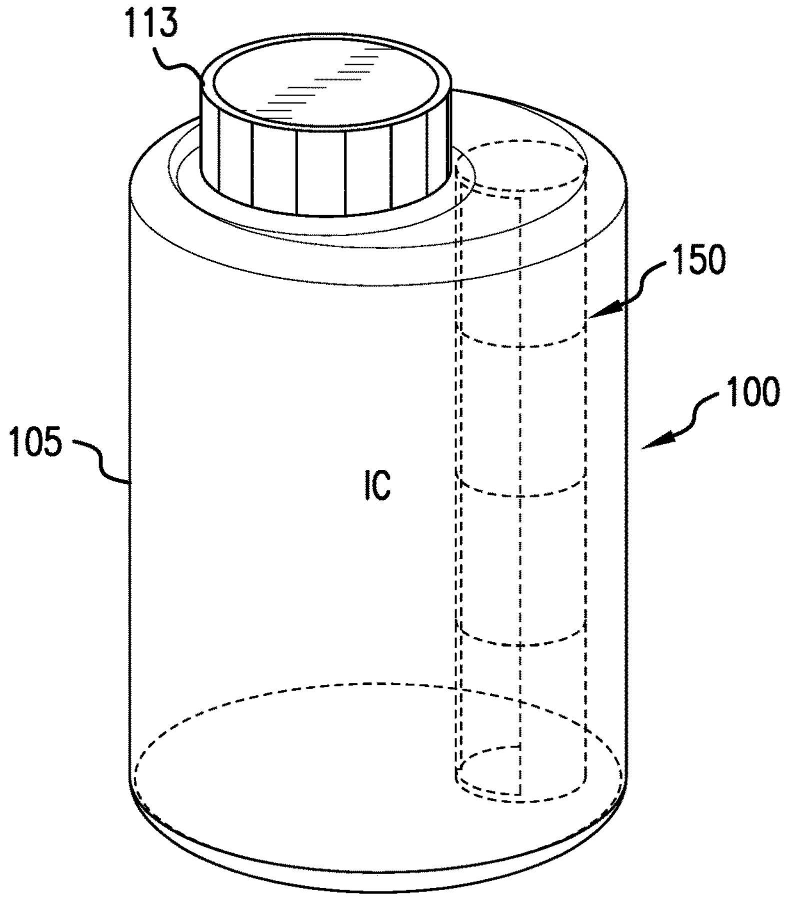
FIG. 5 is a schematic perspective view of the container of FIG. 1 with a cartridge loaded therein.

FIGS. 2 and 3 show cartridge 150 being loaded into second opening 114 and cap 113 being used to close first opening 112, respectively. A medication "M" in the form of pills are shown in the interior chamber of container 100 in FIGS. 2-3. For the sake of clarity, only a few pills are shown although it will be understood that the interior chamber may be full of medication. As used herein, medication represents solid pharmaceutical products which may be in the form of pills, tablets, capsules, caplets and the like. In use, cartridge 150 may be loaded with one or more cylindrical desiccant canisters D1-D4, or other moisture-absorbing material. Cartridge 150 may be inserted into second opening 114, and the upper segment 158 can be secured in place by pushing until the cartridge is friction-fit within the second opening. With cartridge 150 secured inside container 100, desiccant may be securely disposed within the container without fear of falling out of the container, reducing the risk of contamination and/or degradation of the medication (FIG. 5). Specifically, desiccant secured within cartridge 150 may be kept away from the first opening 112 of the container, and window 160 in cartridge 150 may allow moisture to be absorbed by the desiccant within the cartridge.

Figure 6:
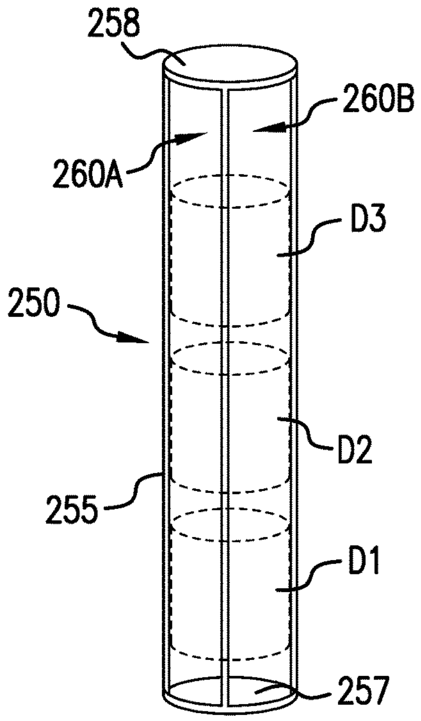
FIGS. 6-7 are schematic perspective views of alternative embodiments of cartridges.
Figure 7:
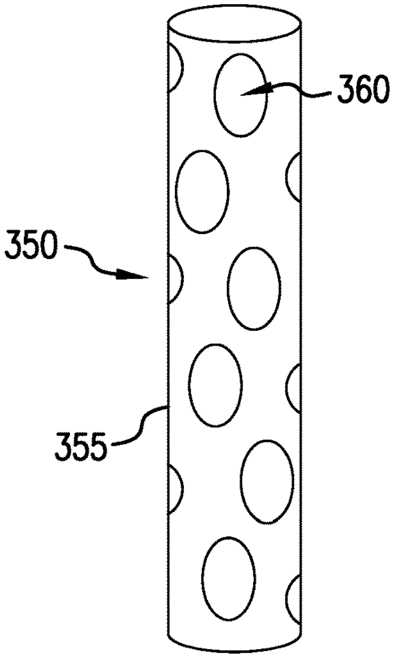

Variations of the container and/or cartridges are possible. For example, FIGS. 6-7 illustrate two additional embodiments of a cartridge to be used with a container. In FIG. 6, cartridge 250 is substantially similar to cartridge 150 and has similar features as cartridge 150 (e.g., a body 255, an inlet 257, and a closed upper segment 258) with certain exceptions. Cartridge 250 includes two windows 260A,260B. It will be understood that any number of windows may be formed in body 255. Additionally, cartridge 250 is illustrated as holding three desiccant canisters D1, D2, D3, each of the canisters being substantially cylindrical. It will be understood that any number of desiccant cannisters (e.g., one, two, three, or four or more cannisters) may be disposed within the cartridge, or that other forms of desiccants may be used instead of the cylindrical cannisters.

FIG. 7 illustrates a cartridge 350 that is substantially similar to cartridges 150, 250, but is one that include a plurality of generally oval or circular windows 360 cut out of the wall 355. In some variations, a cartridge may include windows of different shapes and/or sizes. Additionally, the arrangement and location of the windows may be varied as desired. For example, in examples where the cartridge is disposed and seat adjacent one of the walls of the container, the windows of the cartridge may be located on one side of the cartridge so that the they face the contents of the container (e.g., the medication) found within the interior chamber. Alternatively, the windows may be disposed at multiple circumferential locations or all around the cartridge.

Figure 8:
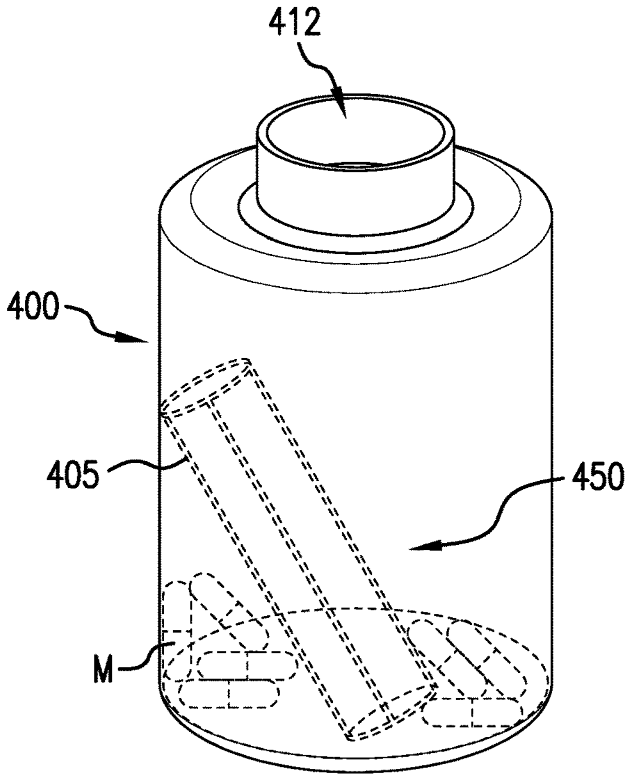
FIG. 8 is a schematic perspective view of a container having a cartridge according to another embodiment of the disclosure.

In FIG. 8, a cylindrical container 400 includes a body 405 and a single opening 412. A cartridge 450, similar to those previously described, is disposed in the inner chamber of container 400. The difference in the embodiment of FIG. 8 from those previously described is that the container does not include a second opening, and does not have an eccentric first opening. Instead medication and the cartridge are both inserted through the first opening, which is centered about the longitudinal axis. Additionally, cartridge 450 is not friction fit in place, but is free to move within the interior chamber. Cartridge 450 is long enough to accommodate multiple desiccant cannisters (e.g., two, three or more desiccant cannisters) and, thus, is less likely to fall out of the container 400 due to its length. The cartridge 450 is also short enough to be inserted into the interior chamber and fall into the interior chamber without blocking first opening 412. In at least some examples, cartridge 450 has a length that is greater than the diameter of single opening 412.

Figure 9A:
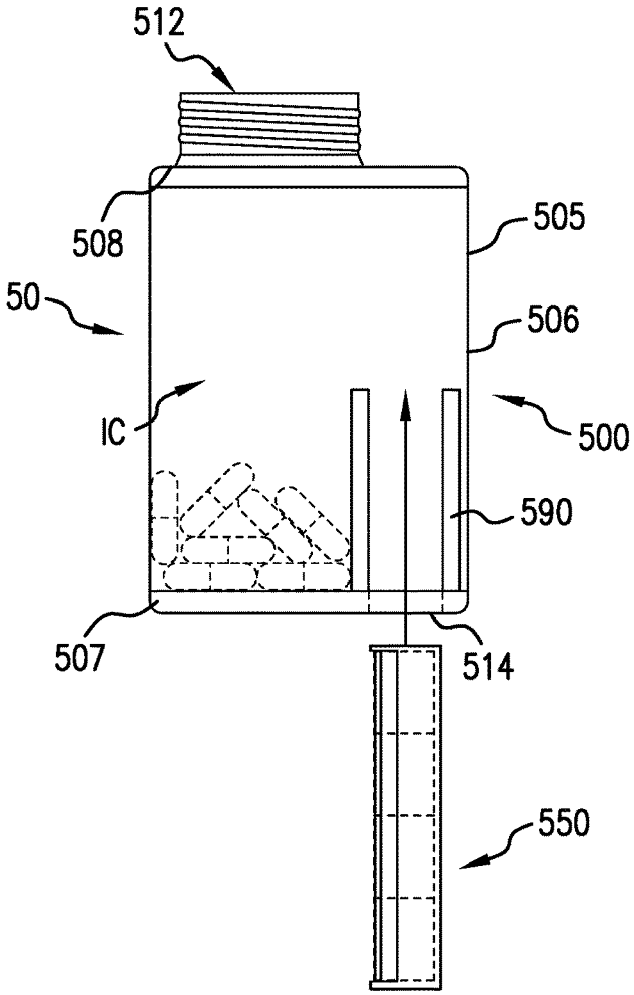
FIGS. 9A-B are schematic side view of a container having a cartridge according to another embodiment of the disclosure.
Figure 9B:
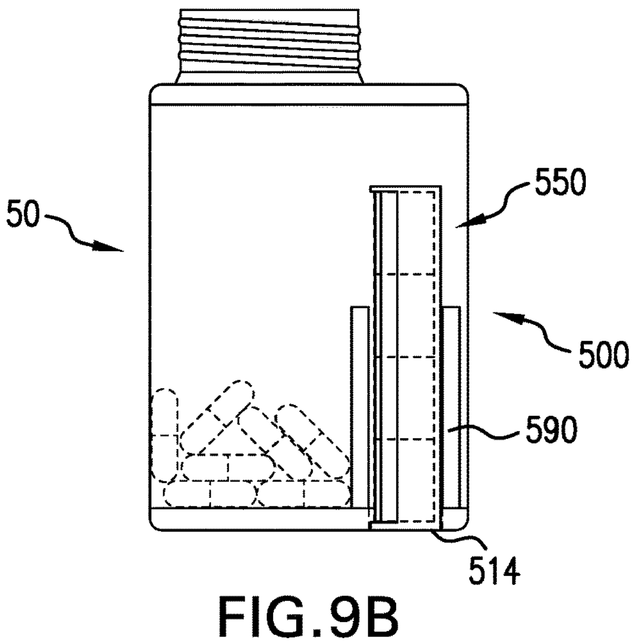

FIGS. 9A-B illustrate yet another embodiment of a container-cartridge system that is similar to that of FIG. 2. Each of the elements shown in FIGS. 9A-B correspond to like-numbered elements shown in FIG. 2, which have been described previously, except that the elements are preceded with a "5" instead of a "1". Briefly, a system 50 is shown having a container 500 and a cartridge 550. Container 500 may be in the form of a generally cylindrical bottle as previously described, and having body 505 including a circumferentially-extending sidewall 506, a base 507 and a top 508. Body 505 may define a first opening 512 adjacent top 508. In this example, container 500 may have a second opening 514 in base 507 that allows access to the interior chamber of the container. Second opening 514 may be circular, oval, or have any other suitable shape that corresponds to the perimeter of cartridge 550. In at least some examples, second opening 514 has a smaller diameter than the first opening 512, or in the case of non-circular openings, second opening 514 may define a smaller area than first opening 512.

Cartridge 550 may be received through second opening 514 and seated (e.g., friction fit) at least partially within the second opening 514. Optionally, one or more supports 590 may be fixedly attached to, or integrally formed with, container 500, and disposed in the interior chamber "IC" of the container. Supports 590 may be formed of a rigid material and may be used to receive at least a portion of the cartridge 550 and form an interference fit therewith so that the cartridge is secured within the interior chamber (FIG. 9B).

Embodiments of the present disclosure may be used with existing assemblies and/or procedures to fill a container with a medication. In at least some examples, one or more cartridges may be inserted or loaded into, or secured at least partially within a container at a first station, and the container may then be filled with the appropriate amount of medication at a second station. Alternatively, in certain examples, the container may be filled with medication at a first station, and then one or more cartridges may be loaded as desired in a second station.

It is to be understood that the embodiments described herein are merely illustrative of the principles and applications of the present disclosure. For example, the number and arrangement of the windows may be varied. The number of cartridges may also be varied, and a container may be formed having, for example, a primary opening, and two secondary openings, each of the secondary openings being capable of receiving and seating a cartridge. Moreover, certain components are optional, and the disclosure contemplates various configurations and combinations of the elements disclosed herein. It is therefore to be understood that numerous modifications may be made to the illustrative embodiments and that other arrangements may be devised without departing from the spirit and scope of the present disclosure as defined by the appended claims.

It will be appreciated that the various dependent claims and the features set forth therein can be combined in different ways than presented in the initial claims. It will also be appreciated that the features described in connection with individual embodiments may be shared with others of the described embodiments.

What is claimed:

1. A system for moisture protection, comprising:
a bottle for storing solid pharmaceutical products including a substantially cylindrical body having a sidewall, a top and a base defining an interior chamber, a first opening being defined in the top of the body, the first opening providing communication to the interior chamber and being eccentric with respect to the central longitudinal axis of the body, and a second opening defined in the top of the body and being disposed adjacent the first opening, the second opening being smaller than the first opening;
a cartridge configured and arranged to be received within the second opening; and
at least one desiccant disposed within the cartridge.

2. The system of claim 1, wherein the cartridge is configured and arranged to create a friction fit with the body when disposed within the second opening.

3. The system of claim 1, wherein the cartridge has a closed upper segment that hermetically seals the second opening when the cartridge is at least partially disposed within the body of the bottle.

4. The system of claim 1, wherein the cartridge has a lower inlet configured to receive at least one cylindrical desiccant cannister.

5. The system of claim 1, wherein the cartridge is shorter than the body of the container.

6. The system of claim 1, wherein the cartridge is substantially cylindrical and includes a circumferentially-extending sidewall, the sidewall defining at least one window.

7. The system of claim 1, wherein the cartridge defines a single window.

8. The system of claim 1, wherein the cartridge defines multiple windows.

9. A system of storing medication comprising:
a bottle for storing solid pharmaceutical products comprising a substantially cylindrical body having a sidewall, a top and a base defining an interior chamber, and a first opening and a second opening defined in the top, the second opening being disposed away from the central longitudinal axis of the bottle and being sized to receive the cartridge so that the cartridge is friction fit therein;
a substantially cylindrical cartridge configured and arranged to be received and seated within the at second opening; and
at least one desiccant cannister disposed within the cartridge.

10. The system of claim 9, wherein the cartridge is substantially cylindrical and includes a circumferentially-extending sidewall, the sidewall defining at least one window.

11. The system of claim 9, wherein the cartridge hermetically seals the second opening.

12. A method of controlling moisture in a bottle for storing solid pharmaceutical products, comprising:
providing a bottle comprising a substantially cylindrical body having a sidewall, a top and a base defining an interior chamber, a first opening being defined in the top of the body, the first opening providing communication to the interior chamber and being eccentric with respect to the central longitudinal axis of the body, and a second opening defined in the top of the body and being disposed adjacent the first opening, the second opening being smaller than the first opening;
seating a substantially cylindrical cartridge within the second opening, wherein the cartridge is capable of securing at least one desiccant cannister;
loading the substantially cylindrical cartridge with the at least one desiccant cannister; and
advancing the substantially cylindrical cartridge through the second opening.

13. The method of claim 12, wherein advancing the substantially cylindrical cartridge comprises pushing the cartridge through the second opening and hermetically sealing the interior chamber of the bottle.

14. The method of claim 12, wherein loading the substantially cylindrical cartridge with the at least one desiccant cannister comprises loading the cartridge with at least two desiccant cannisters.

15. The method of claim 12, wherein seating a substantially cylindrical cartridge comprises providing a cartridge having at least one window formed in a sidewall.

16. The method of claim 12, further comprising the step of choosing a number of desiccant cannisters to be loaded into the cartridge based on a medication in the interior chamber of the bottle.

* * * * *